United States Patent [19]

Lott

[11] 4,049,599

[45] Sept. 20, 1977

[54] HIGH SOLIDS POLYESTERS CAPABLE OF DISSOLVING IN AN ORGANIC SOLVENT

[75] Inventor: Joseph C. Lott, Manchester, Mo.

[73] Assignee: Grow Chemical Corporation, New York, N.Y.

[21] Appl. No.: 647,663

[22] Filed: Jan. 9, 1976

[51] Int. Cl.$^2$ .......................... C09D 3/52; C09D 3/64
[52] U.S. Cl. .................... 260/22 M; 260/21; 260/22 R; 260/22 CQ; 428/458
[58] Field of Search ................... 260/22 M, 22 R, 21, 260/22 CQ

[56] References Cited

U.S. PATENT DOCUMENTS

| 2,973,331 | 2/1961 | Kraft | 260/22 R |
|---|---|---|---|
| 3,268,483 | 8/1966 | Klootwijk et al. | 260/22 R |
| 3,379,548 | 4/1968 | Jen | 260/22 R |
| 3,457,236 | 7/1969 | Ehrhart et al. | 260/22 R |
| 3,468,826 | 9/1969 | McWhorter et al. | 260/22 R |
| 3,485,781 | 12/1969 | Wallman et al. | 260/22 R |
| 3,506,621 | 4/1970 | Fukushima et al. | 260/22 R |
| 3,714,091 | 1/1973 | Lasher | 260/22 R |
| 3,883,454 | 5/1975 | Dhein et al. | 260/22 R |
| 3,892,903 | 7/1975 | Dowbenko | 428/460 |
| 3,920,595 | 11/1975 | Anderson et al. | 260/22 CQ |
| 3,994,851 | 11/1976 | Chang | 260/29.4 R |

FOREIGN PATENT DOCUMENTS 2,407,791   8/1975   Germany

Primary Examiner—Ronald W. Griffin
Attorney, Agent, or Firm—Burton, Parker & Schramm

[57] ABSTRACT

A composition of matter comprising a polyester capable of dissolving in an organic solvent, having a solids content of at least 75% by weight, at a viscosity of X-Z on the Garner scale, prepared by reacting an aromatic polycarboxylic acid, anhydride, or a functionally acid esterifiable derivative thereof, an aliphatic polycarboxylic acid, anhydride or a functionally acid esterifiable derivative thereof, an aliphatic polyol and a monofunctional fatty acid to an acid number less than about 10, and then reacting the product of that reaction with an aromatic or aliphatic polycarboxylic acid, anhydride or a functional acid esterifiable derivative thereof to an acid number greater than 10 and less than about 60, wherein the total reactants have a hydroxyl/carboxyl ratio of greater than 1; the amount of monofunctional fatty acid employed ranges from about 20 to about 50% of the total number of acid equivalents of the reactants and the amount of aromatic polycarboxylic acid reacted in the first step ranges from about 20% to about 50% of the total number of acid equivalents of the reactants. Also described is a coating composition employing the above described polyester in conjunction with a nitrogenous composition, preferably for coating metallic substrates.

7 Claims, No Drawings

HIGH SOLIDS POLYESTERS CAPABLE OF DISSOLVING IN AN ORGANIC SOLVENT

BACKGROUND OF THE INVENTION

The present invention is concerned with polyesters that are used for the application to substrates when the film forming components have a high solids content.

Coating compositions which can be applied or cured at lower temperatures than normal or which have less solvent emission yet still produce coatings having high gloss, good adhesion and good flexibility are highly desirable compositions.

U.S. Pat. No. 3,039,979 describes polyester compositions which may be blended with amine-aldehyde resins. U.S. Pat. No. 3,789,037 teaches thermosetting coating compositions of an alkyd resin mixture and aliphatic polyisocyanate cross-linking agent. U.S. Pat. No. 3,752,778 teaches water dilutable alkyd resins modified by radicals of drying fatty acids. U.S. Pat. No. 3,244,673 teaches polyurethanes from polyesters containing monocarboxylic acids. U.S. Pat. No. 2,991,274 teaches oil-less alkyd resins based on isophthalic acid as plasticizers for urea-aldehyde resins and the like. U.S. Pat. No. 2,553,682 teaches oil modified alkyd resins modified with cellulose derivatives. U.S. Pat. No. 3,268,483 teaches a two step process of preparing polyesters. U.S. Pat. No. 3,223,659 teaches self-disbursable water soluble polyesters. U.S. Pat. No. 3,117,950 teaches polyester preparation as does U.S. Pat. No. 3,049,506. Metal salts of 2-ethyl hexoic acid are taught in U.S. Pat. No. 2,970,973. Oil modified alkyd resins are taught in U.S. Pat. No. 2,895,932. U.S. Pat. No. 2,901,465 teaches the utilization of triols in the preparation of alkyd resins. Other references which discuss alkyd resins are U.S. Pat. No. 3,652,502; U.S. Pat. No. 2,973,332; U.S. Pat. No. 2,901,965; U.S. Pat. No. 3,668,275; U.S. Pat. No. 3,668,276; U.S. Pat. No. 3,734,890; U.S. Pat. No. 3,829,530. Polyester polyols are discussed in U.S. Pat. No. 3,819,586. Alkyd resins and amino resin coatings are discussed in a Federation series on Coatings Technology, Units 5 and 13, respectively, published by Federation of Societies for Paint Technology.

SUMMARY OF THE INVENTION

The difficulty with all of the prior art references is that energy saving polyester compositions are not taught which may be applied at room temperature and subsequently heat cured, wherein the film forming solids content is reasonably high.

A composition of matter comprising a polyester capable of dissolving in an organic solvent, having a solids content of at least 75% by weight, at a viscosity of X-Z on the Garner scale, prepared by reacting an aromatic polycarboxylic acid, anhydride, or a functionally acid esterifiable derivative thereof, an aliphatic polycarboxylic acid, anhydride or a functionally acid esterifiable derivative thereof, an aliphatic polyol and a monofunctional fatty acid to an acid number less than about 10, and then reacting the product of that reaction with an aromatic or aliphatic polycarboxylic acid, anhydride or a functional acid esterifiable derivative thereof to an acid number greater than 10 and less than about 60, wherein the total reactants have a hydroxyl/carboxyl ratio of greater than 1; the amount of monofunctional fatty acid employed ranges from about 20 to about 50% of the total number of acid equivalents of the reactants, and the amount of aromatic polycarboxylic acid reacted in the first step ranges from about 20% to about 50% of the total number of acid equivalents of the reactants.

Preferably, the polyester composition of the present invention is used in conjunction with organic solvent soluble cross-linkable nitrogenous composition.

DESCRIPTION OF PREFERRED EMBODIMENTS

In the preparation of the polyester composition of the present invention, there are multiple steps that are employed. A low molecular weight composition, that is, one having a molecular weight (by weight) less than about 3000, preferably about 1000 to about 1500 is desired. By following the process of the present invention, a polyester can be obtained having a polymeric composition well defined with the molecular weight distribution controlled.

In the first step of the preparation of the polyester, an acid number less than 10 is desirable. In the first step of the process for preparing the polyester, about 20 to 50% of the acid equivalents employed are made available from a monofunctional aliphatic fatty acid. In the first step it is also desirable that the aliphatic polycarboxylic acid anhydride or functionally acid esterifiable derivative thereof, based on the number of acid equivalents, range from about 20 to 50% and that the hydroxyl to carboxyl ratio in the first step ranges from about 1.3 to about 2.3, preferably about 1.5. It is also preferred that the ratio of the number of acid equivalents of the aromatic polycarboxylic acid be on a 1 to 1 basis with the aliphatic polycarboxylic acid in the first step.

The first step of the reaction to produce the polyester of the present invention is a liquid phase reaction wherein the solvent is an organic solvent in which the polyester product is soluble. The temperature at which the reaction takes place ranges from about 250° F (121° C) to about 500° F (260° C), preferably no higher than about 450° F (232° C).

The second step of the process of preparing the polyester of the present invention employs a similar temperature and solvent as the first step. The purpose of the addition of the polycarboxylic material is to increase the acid number from that of the polyester of the first step to an acid number less than about 60, preferably greater than 10 and even more preferably at about 40 to 45.

Throughout the specification, "polycarboxylic" means more than one carboxyl group or an anhydride or an acid ester which may be esterified to an acid equivalent such as the lower alkyl acid esters as the methyl ester and the like.

Although any aromatic polycarboxylic acid may be employed, the preferred aromatic polycarboxylic acids are phthalic acid, the anhydride thereof, or the alkyl ester derivatives thereof, terephthalic, isophthalic, alkylated derivatives thereof such as the ring substituted dimethyl or the tertiary butyl derivatives thereof, as well as the naphthenic derivatives thereof.

Among the aliphatic polycarboxylic acids that may be employed are those that contain unsaturation such as ethylenic unsaturation as well as the saturated aliphatic polycarboxylic acids preferably those containing from 4 to 12 carbon atoms, such as succinic acid, glutaric acid, adipic acid, pimelic acid, suberic acid, azelaic acid and sebacic acid, and the like; cycloaliphatic polycarboxylic acid or anhydrides as tetrahydrophthalic acid, hexahydrophthalic acid and the like.

Among the monofunctional fatty acids that may be employed in the present invention, suitable ones are those containing up to 20 carbon atoms, with or without ethylenic unsaturation, such as 2-ethyl hexoic acid, oleic acid, lineoic acid, castor fatty acid, butyric acid, valeric acid, caproic acid, pelagonic acid, lauric acid, myristic acid, palmitic acid, stearic acid and the like.

Among the aliphatic alcohols that may be employed in the present invention, preferred are those that are saturated polyhydric materials containing either a diol or a triol such as alcohols containing from 2 through 12 carbon atoms such as butane diol, hexane diol, octane diol, decane diol, dodecane diol, trimethylolethane, trimethylolpropane; 1,2,6-hexane triol, pentaerythritol, neopentyl glycol and the like, or cycloaliphatic alcohols containing from 5 to 8 carbon atoms per ring, such as, cyclohexanediol; 1,4-dimethanol cyclohaxane and the like.

The solvents that may be employed in the preparation of the polyester of the present invention are any one of the normal inert organic solvents such as aromatic solvents as benzene, xylene, toluene; chlorinated hydrocarbons having from 1 to 4 carbon atoms such as chloroform, dichloroethane, trichloroethane, and the like. Other solvents that may be employed are Cellosolve (trademark of Union Carbide for ethylene glycol monoethyl ether) acetate, butyrate, and the like.

The polyester composition of the present invention is preferably employed with a cross-linkable nitrogenous composition which is compatible with the organic solvent for the polyester composition. The ratio of the binder components of the film forming composition ranges from about 0.5 to 5.0:1, polyester:nitrogenous composition.

The purpose of the nitrogen containing composition is to cross-link with the polyester during the curing reaction. The nitrogen containing compositions should have a hydrogen that is replaceable therefrom so as to have the ability to cross-link with the polyester composition. Suitable nitrogen containing compositions are amine formaldehyde condensates such as condensates of formaldehyde and a triazine such as melamine and the like. Other suitable nitrogenous compositions are urea, thiourea, cyanamide, ethylene urea, propylene urea, dicyandiamide, di or trimethyl urea, benzoguanamine, alkylated amines such as methyl, ethyl, propyl amine and the like, ethylene diamine, ammonia, analine, cetylamine, triazone, dimethyluron, guanidine, biuretes, alkylated derivates of melamine such as butylated melamine, or butylated benzoguanamine, urea formaldehyde resins, and the like. Preferred nitrogen containing compositions are the alkylated formaldehyde melamine derivatives wherein the alkyl group has from 1 to 6 carbon atoms.

The polyester composition of the present invention when combined with a nitrogen composition is normally applied to a desirable substrate, preferably a metallic substrate such as aluminum, steel, iron, zinc, titanium and alloys thereof, and the like.

It is to be appreciated that the coating composition that is applied in the present application would contain a catalyst which would accelerate the curing rate such as an acid catalyst as paratoluene sulfonic acid and the like.

It has been found particularly advantageous with the present composition that desirable coatings may be obtained having high pigmentation content, so that substantially more metal substrate may be coated than was obtained with prior coating compositions. In other words, a very high pigmentation composition can be utilized when the polyester composition in the present invention is employed. When the coating is applied a thinner film is necessary with the present coating composition yet satisfactory film qualities are obtained.

Listed below is a formulation of the invention, on a parts by weight basis.

| Components | Range | Preferred Formulation |
| --- | --- | --- |
| Pigment, such as $TiO_2$, and the like | 30–50 | 40 |
| Polyester | 20–50 | 37 |
| Cross-linking Agent | 10–30 | 15 |
| Solvent | 0–20 | 8.2 |
| Viscosity | | 77 Sec Ford No. 4 Cup at 80° F |

The binder to pigment ratio may range from about 1–3:1, by weight. Preferably, the dry coating weight is at least about 25 mg/4 sq. in., even more preferably up to about 40 mg/4 sq. in. (about 0.3 mil) and most preferably about 30–35 mg/4 sq. in.

The coating composition of the present invention may be applied in the normal manner, such as spraying, dipping, rolling and the like. Preferably, however, the coating compositions are roll coated onto the metallic substrate at ambient temperature or room temperature which ranges from about 72° F to about 78° F (22° C to 28° C) at atmospheric pressure.

After the coating composition of the present invention has been applied, it is heat treated in order to cause the final curing of the composition. Heat treatment normally occurs at a temperature from about 200° F (93° C) to 500° F (260° C), preferably at about 300° F (149° C) for a period of time from about 10 minutes to 1 hour, preferably about 15 minutes.

It is to be appreciated that other components may be present in the coating composition that is normally employed by one of ordinary skill in the art such as pigment as titanium dioxide and the like, flow control agents, pigment wetting agents, and the like.

EXAMPLES

EXAMPLE 1

242 g. of 2-ethyl hexoic acid (1.68 moles), 116 g. of isophthalic acid (0.70 moles), 102 g. of adipic acid (0.7 moles), 206 g. 1,4-cyclohexanedimethanol at 70% by weight in MeOH (1.0 moles), 201 g. of trimethylolpropane (1.5 moles), and 0.8 g. of triphenylphosphite are heated together under a carbon dioxide atmosphere, and as the temperature rises, the solvent methanol is removed through distillation. The remainder of the first stage of the preparation is conducted with a xylene reflux at a temperature of 460° F. The solvent content of the reaction mixture is held to 5% or less and the water is continuously removed. When the polyester exhibits and acid number of 10.0 mg KOH/g. or less, the temperature is lowered to 350° F and 77 g. of phthalic anhydride (0.52 moles) is added. A temperature of 300°–330° F is then maintained for 30 minutes, after which the completed polyester is reduced in a suitable solvent. The resulting polyester exhibits an acid number of 40–45 mg KOH/g. resin.

EXAMPLE 2

324 g. of oleic acid (1.126 moles), 335 g. of trimethylolpropane (2.5 moles), 116 g. of isophthalic acid (0.7 moles), 102 g. of adipic acid (0.7 moles), and 0.8 g. of triphenylphosphite are heated together under a carbon dioxide atmosphere to a temperature of 450°–475° F with a xylene reflux. The solvent content of the reaction mixture is held to 5% or less and the water is continuously removed. When the polyester exhibits an acid value of 10 mg. KOH/g. or less, phthalic anhydride (0.811 moles) is added. A temperature of 300°–330° F is maintained for 30 minutes, at which time the completed polyester is cooled and reduced in a suitable solvent. The resulting polyester exhibits an acid number of 50–60 mg. KOH/g. resin.

EXAMPLE 3

170 g. of 2-ethyl hexoic acid (1.18 moles), 116 g. of isophthalic acid (0.7 moles), 102 g. of adipic acid (0.7 moles), 206 g. of 1,4-cyclohexanedimethanol at 70% by weight in MeOH (1.0 moles), 201 g. of trimethylolpropane (1.5 moles), and 0.8 g. of triphenylphosphite are heated together under a carbon dioxide atmosphere. The solvent methanol is removed through distillation as the temperature rises. The remainder of the first stage is conducted with a xylene reflux at a temperature of 450°–470° F. The xylene solvent in the reaction mixture is held to 5% or less and the water is continuously removed. When the polyester exhibits an acid value of 10 mg. KOH/g., the temperature is lowered to 400° F and 148.5 g. of castor fatty acids (0.50 moles) is added. The temperature is once again raised to 450°–470° F where it is held until the polyester exhibits an acid number of 5–7 mg. KOH/g. At this point, the temperature is cooled to 350° F and 77 g. (0.52 moles) of phthalic anhydride is added. A temperature of 300°–330° F is held for 30 minutes, at which time the completed polyester is cooled and reduced in a suitable solvent. The resulting polyester exhibits an acid number of 36 mg. KOH/g. resin.

EXAMPLE 4

Using the polyester prepared from Example 1, a coating composition was formulated as described below:

| Composition | Parts by Weight |
| --- | --- |
| TiO$_2$ | 39.31 |
| Product of Example 1 (100% Solids) | 37.15 |
| Methylated Melamine Formaldehyde Resin Resimene 747 (Mark of Monsanto) | 15.03 |
| Solvent (Butyl Cellosolve Acetate and Methyl Cellosolve) | 8.17 |
| Acid Catalyst | 0.005 |
| % Solids (Filler, Pigment and Catalyst Free Basis) | 87% |
| Viscosity | 77 Sec. Ford No. 4 Cup at 80° F |

The coating composition was roll coated at room temperature on to tin-free steel panels and baked 10 minutes at 350° F. The panels were then stored in a Studebaker press for 24 hours at 150° F and 3,000 lbs. gauge pressure. The coating had good adhesion and did not stick, pick or mar when other similar coated panels were placed adjacent each other. This test is a measurement of the tackiness of a coating. By "picking" is meant the tendency of the coated panel to have pieces of other similarly coated panels adhere to the coating as a result of being placed next to each other.

The coated panels were also subjected to the reverse impact test and they passed at the 30 lb. level and failed at the 50 lb. level.

The gloss qualities of the panels coated by the above described application, cure, cycle and thickness, were tested in a BYK-Mallinkrodt gloss meter which measures the light reflection at 60°. The ratings of the coated panels for various substrates are reported below:

| Substrate | Rating |
| --- | --- |
| Electrolytic Tin Plate | 95–98 |
| Tin Free Steel | 95–96 |
| Black Plate | 90–95 |

What is claimed is:

1. A composition of matter comprising a polyester capable of dissolving in an organic solvent, having a solids content of at least 75% by weight, (on a pigment, filler and catalyst-free basis), at a viscosity of X-Z on the Garner scale, prepared by reacting an aromatic polycarboxylic acid, anhydride, or a functionally acid esterifiable derivative thereof, an aliphatic polycarboxylic acid, anhydride or a functionally acid esterifiable derivative thereof, an aliphatic polyol and a monofunctional fatty acid to an acid number less than about 10, and then reacting the product of that reaction with an aromatic or aliphatic polycarboxylic acid, anhydride or a functional acid esterifiable derivative thereof to an acid number greater than 10 and less about 60, wherein the total reactants have a hydroxyl/carboxyl ratio of greater than 1; the amount of monofunctional fatty acid employed ranges from about 20 to about 50% of the total number of acid equivalents of the reactants, and the amount of aromatic polycarboxylic acid reacted in the first step ranges from about 20% to about 50% of the total number of acid equivalents of the reactants.

2. The composition of claim 1 wherein the hydroxyl/carboxyl ratio in the first step of preparing the polyester ranges from about 1.3 to about 2.3.

3. The composition of claim 2 wherein the ratio of the number of acid equivalents in Step 1 of preparing the polyester for the aromatic polycarboxylic acid, anhydride or acid esterifiable derivative thereof and the aliphatic polycarboxylic acid, anhydride or acid esterifiable derivative thereof is one.

4. The composition of claim 1 wherein the aliphatic polyol is comprised of diols and triols present in a ratio of the number of hydroxyl equivalents of 1.5:1, triol:diol.

5. The composition of claim 1 further comprising an organic solvent soluble cross-linkable nitrogenous composition wherein the components are present on a weight basis as:

0.5 – 5:1 Polyester:Nitrogenous Composition

6. The composition of claim 5 wherein the nitrogenous composition is an amine-aldehyde condensate.

7. The composition of claim 6 wherein the nitrogenous composition is a melaminealdehyde condensate.

* * * * *